W. F. BRAUN.
WEIGHING APPARATUS.
APPLICATION FILED OCT. 25, 1911.
1,090,017.
Patented Mar. 10, 1914.
7 SHEETS—SHEET 5.
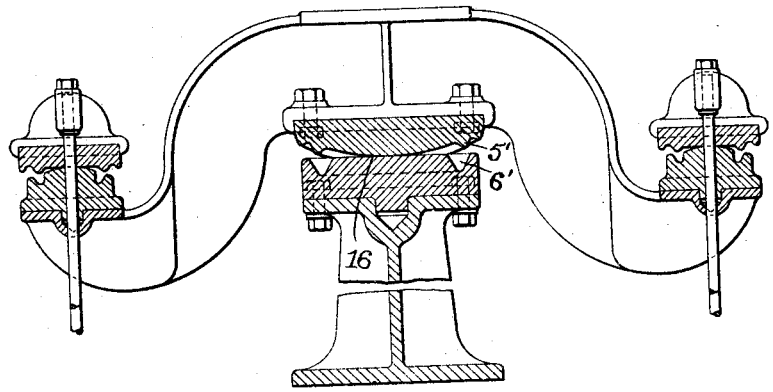
Fig. 6.
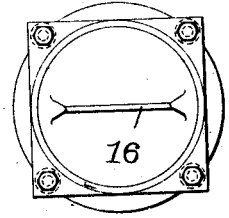
Fig. 7.
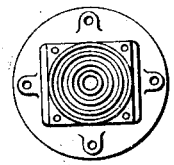
Fig. 5ª
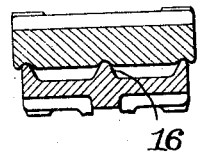
Fig. 8.
Attest:
Ewd L. Tolson
H. M. Barrett
Inventor:
William F. Braun,
by Spear, Middleton, Donaldson & Spear
Atty's.

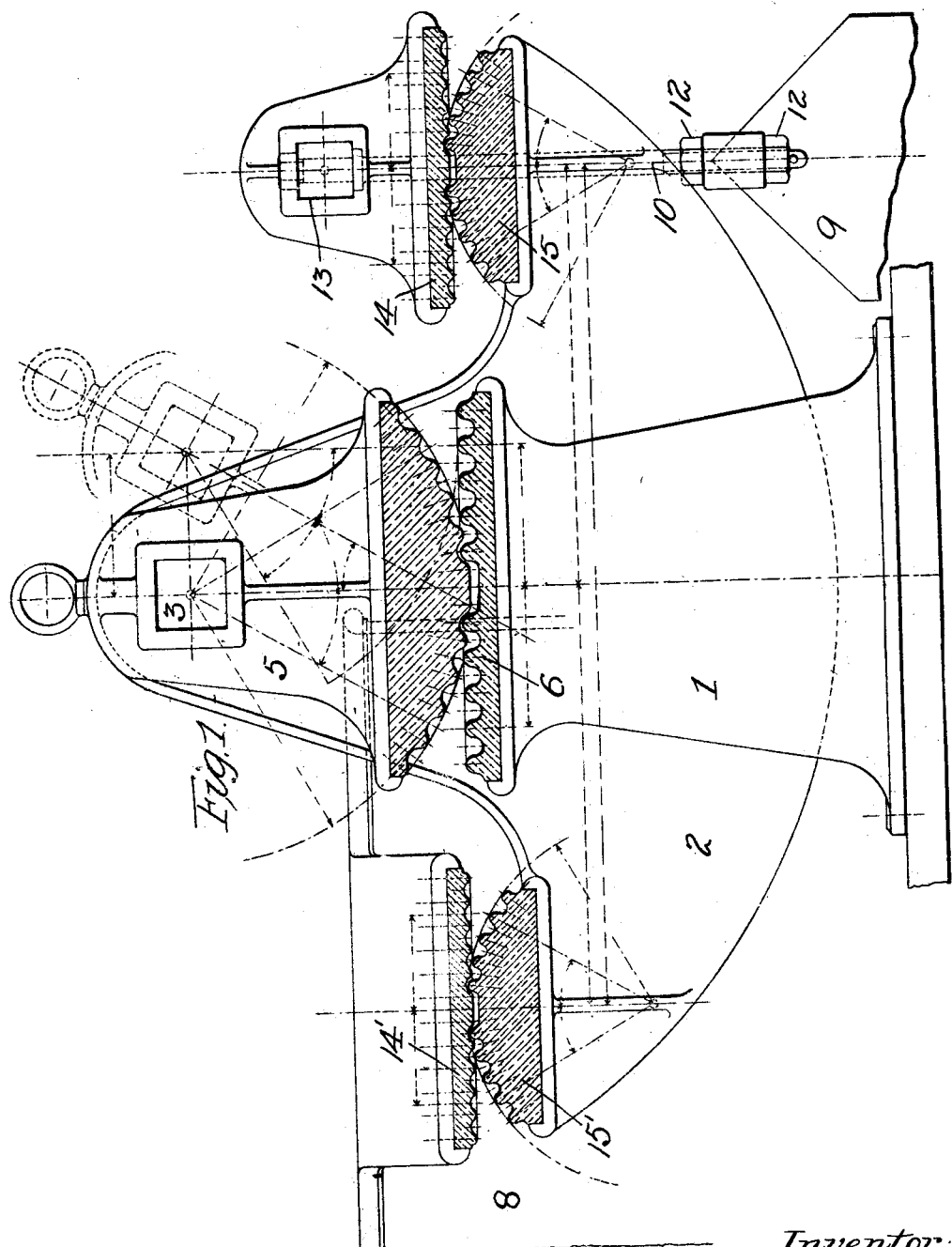

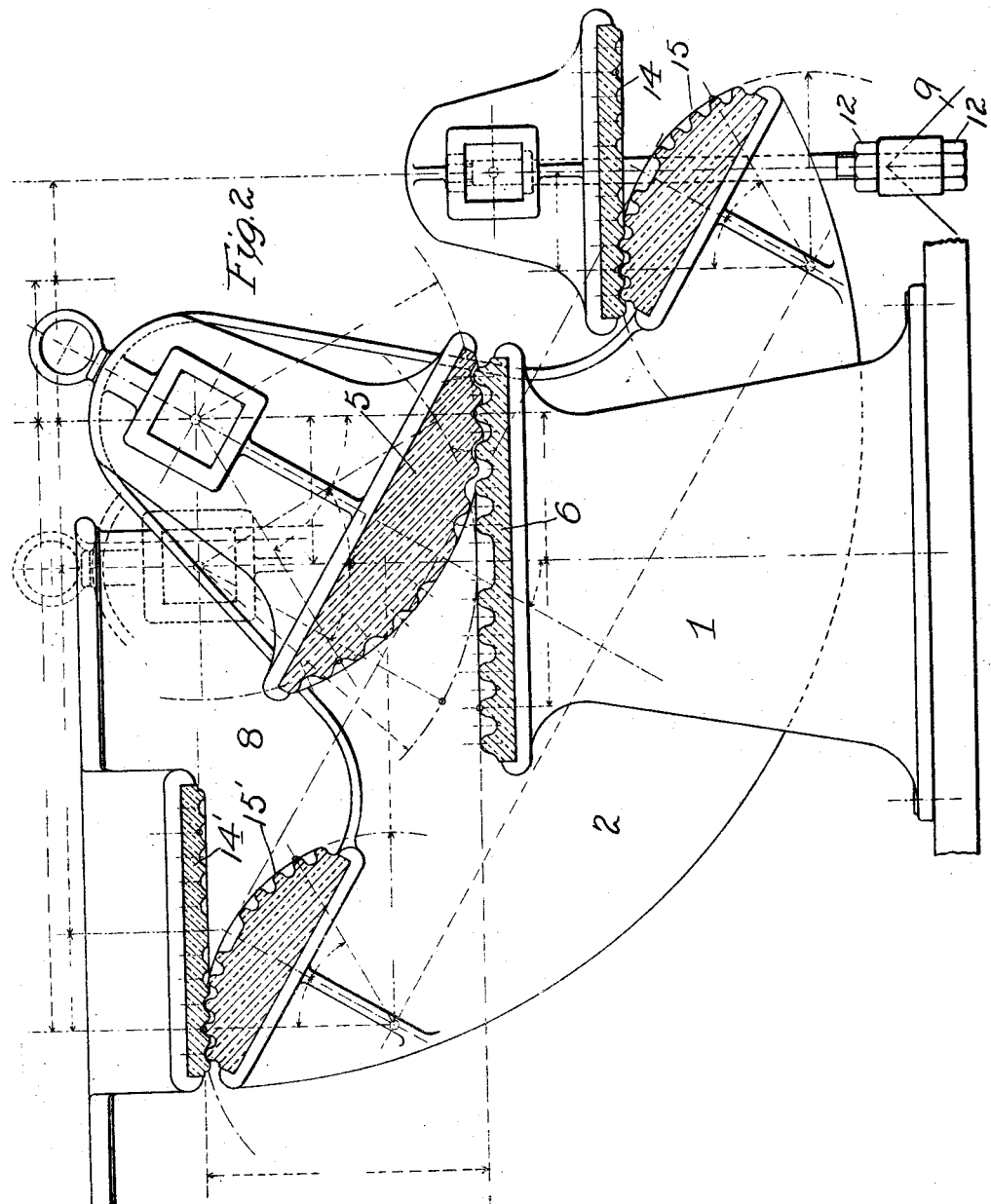

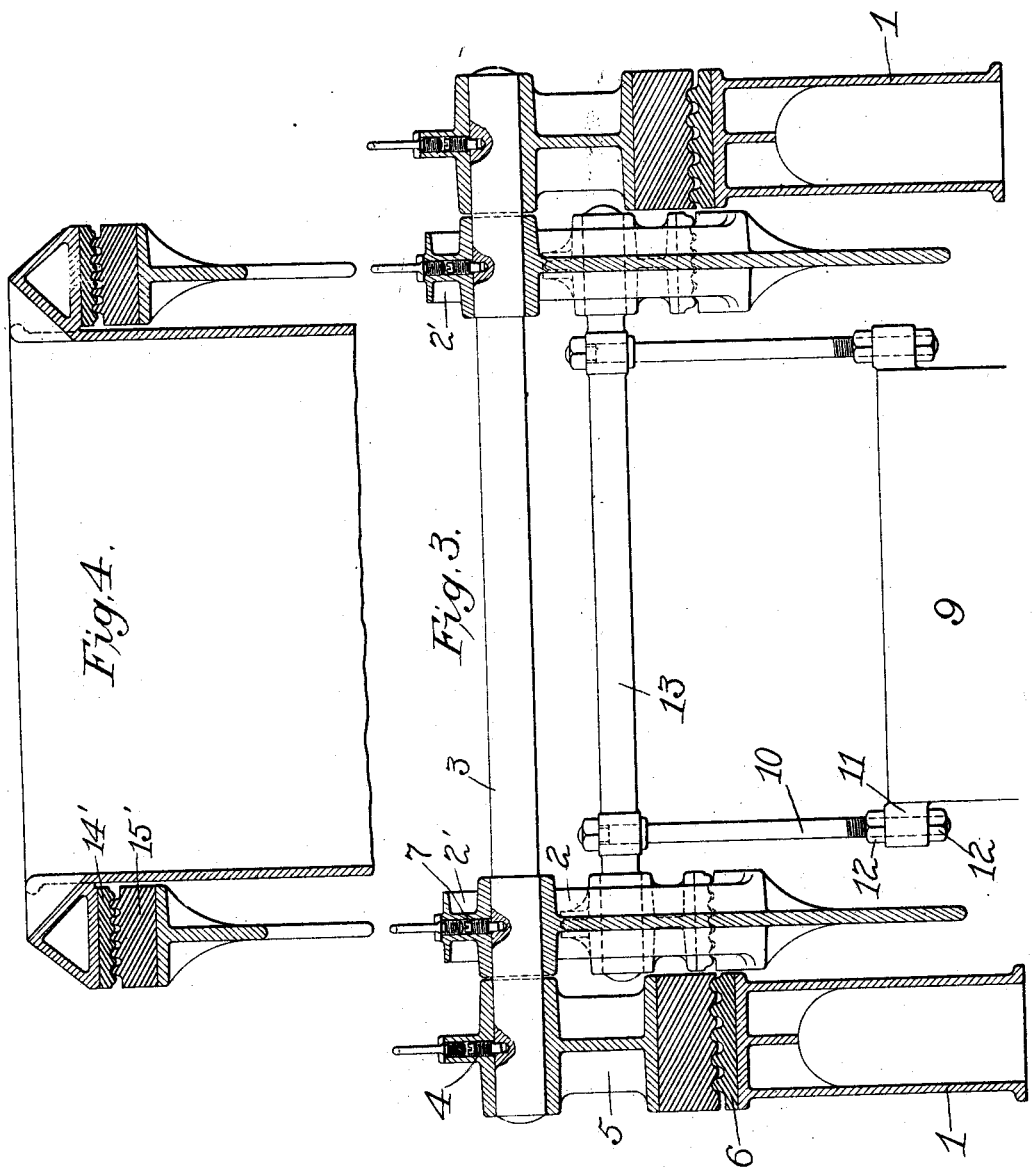

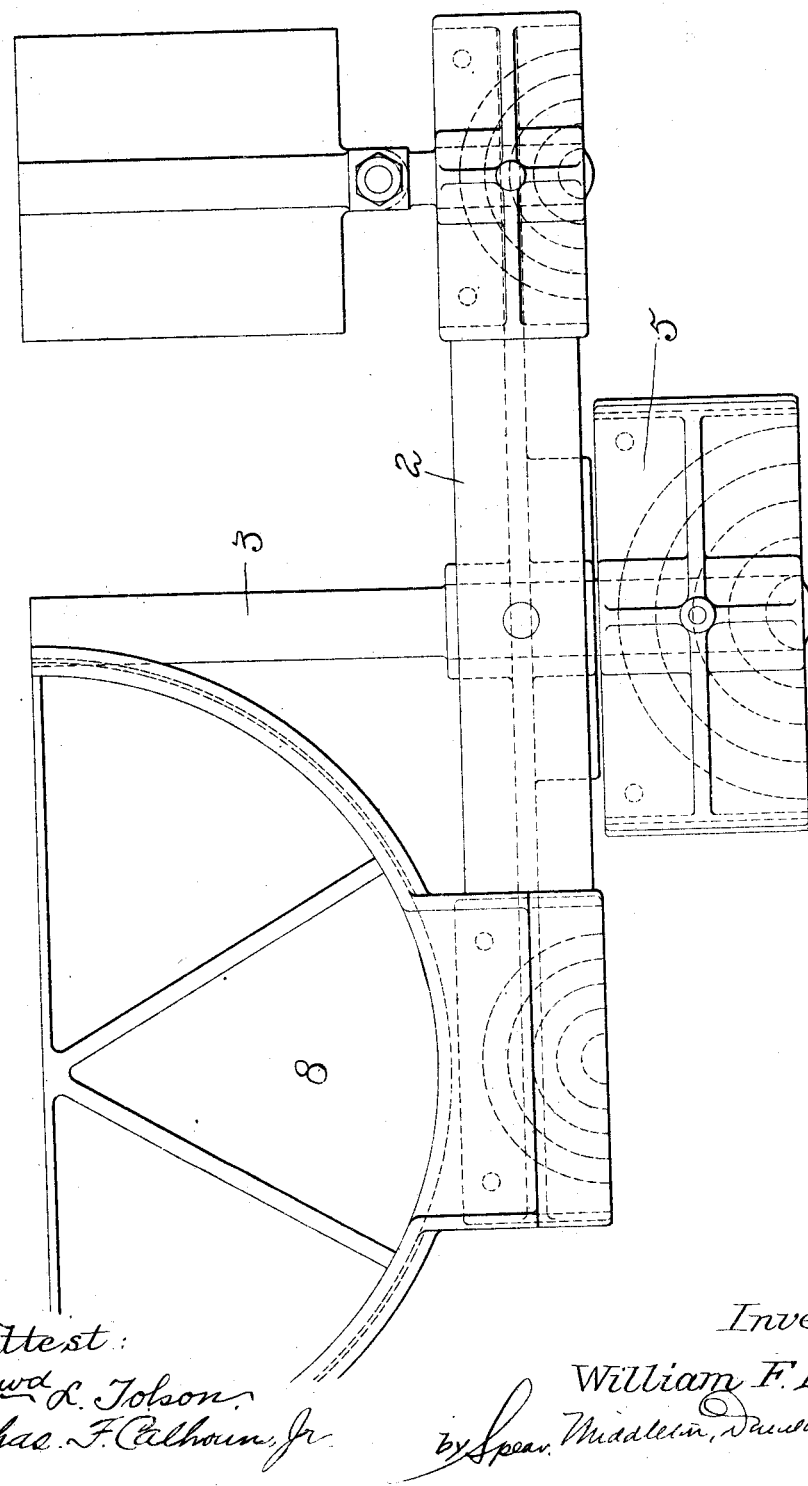

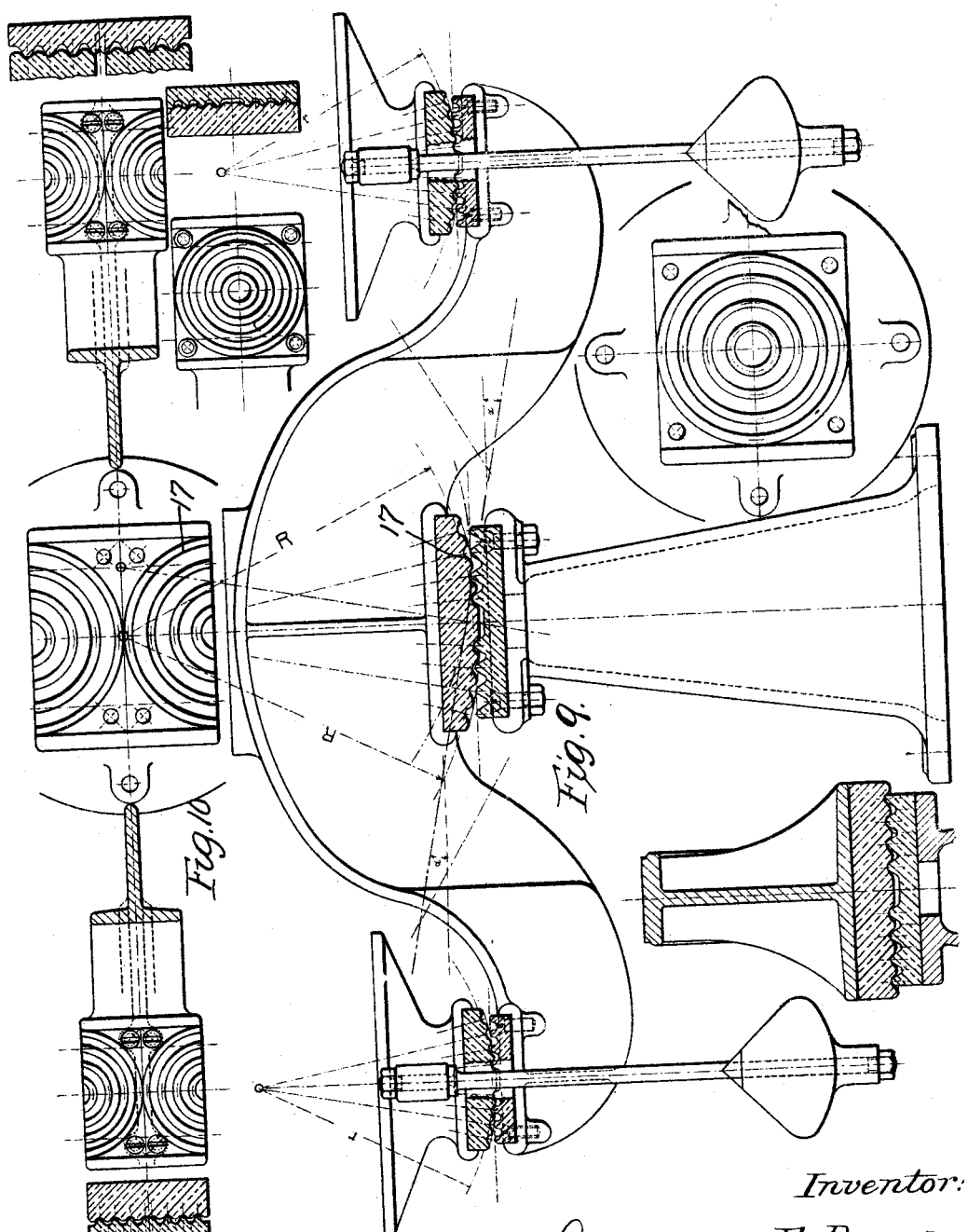

W. F. BRAUN.
WEIGHING APPARATUS.
APPLICATION FILED OCT. 25, 1911.
1,090,017.
Patented Mar. 10, 1914.
7 SHEETS—SHEET 7.
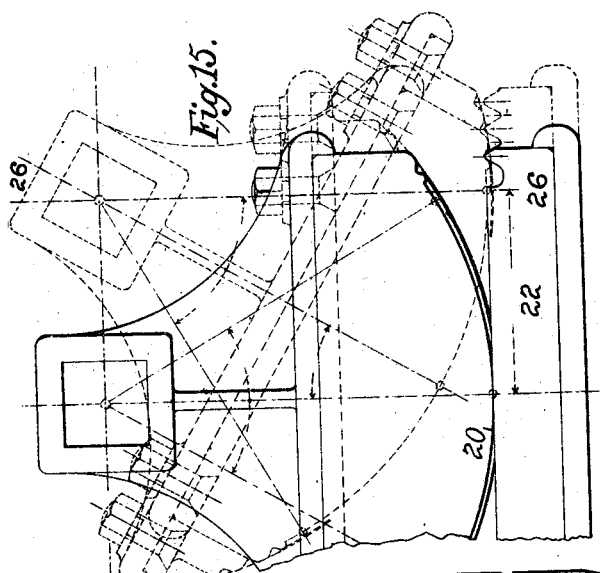
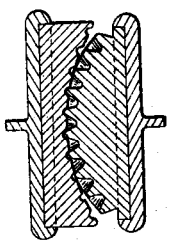
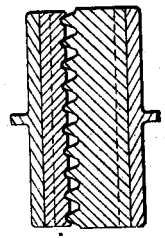
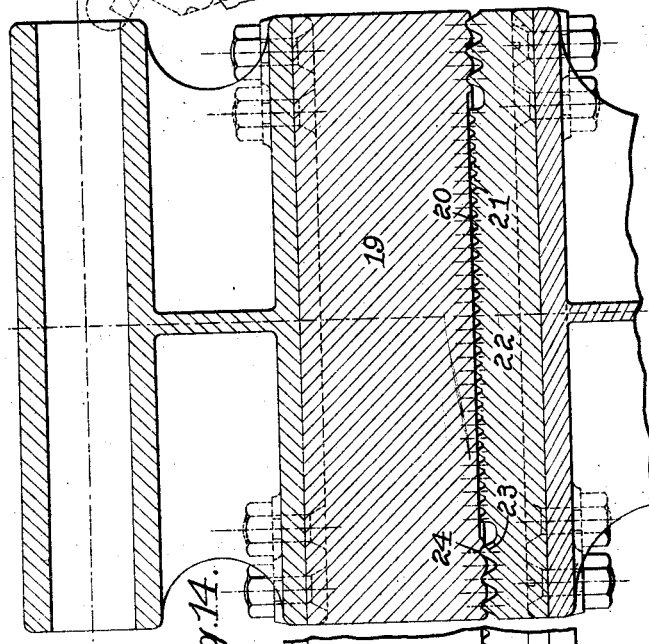
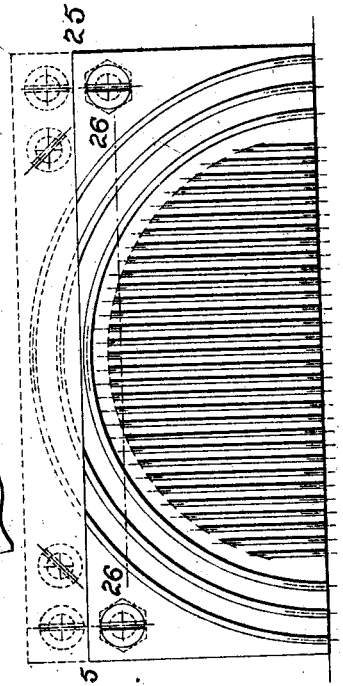
Attest:
Edwd L. Tolson
H. M. Barrett
Inventor
William F. Braun,
by Spear, Middleton, Donaldson & Spear
Atty's.

UNITED STATES PATENT OFFICE.

WILLIAM F. BRAUN, OF BROOKLYN, NEW YORK.

WEIGHING APPARATUS.

1,090,017.                    Specification of Letters Patent.    Patented Mar. 10, 1914.

Application filed October 25, 1911. Serial No. 656,677.

*To all whom it may concern:*

Be it known that I, WILLIAM F. BRAUN, citizen of the United States, residing at Brooklyn, New York, have invented certain new and useful Improvements in Weighing Apparatus, of which the following is a specification.

It is the object of my invention to provide a scale or weighing machine having a fulcrum with the members thereof rolling one upon the other and avoiding the use of knife edges which are objectionable on account of the wear and strain to which they are subjected and the liability of said knife edges breaking down or succumbing to the wear and pressure between the parts, and in carrying out my invention, having the rolling fulcrum members, I aim to provide means whereby the beam in its movement will be controlled, and it will be maintained accurately in relation to the stationary fulcrum member, both longitudinally and horizontally, it being prevented from having any displacement in either direction, whatever the angular position of the beam may be in relation to the stationary fulcrum member.

In carrying out my invention, I employ one fulcrum member which is generally of a straight or flat form coöperating with the other fulcrum member which may be described in general terms as being of curved form and adapted to roll upon the straight or flat member. More specifically stated, the flat or straight member is provided with a series of concentric ribs or projections, while the curved member is provided with a series of grooves adapted to fit the projections or ribs on the flat member so as to maintain a proper relation between the beam and the main fulcrum member during the rolling action of one part on the other.

The invention consists in the features and combination and arrangement of parts hereinafter described and particularly pointed out in the claims.

In the accompanying drawings Figure 1 is an elevation partly in section of a scale beam and its stationary supporting frame, the beam being in its central position assumed by it when the receiver has its full load. Fig. 2 is a view similar to Fig. 1, but with the beam at its extreme angular or inclined position in relation to the stationary frame or fulcrum and in a state of poise with the receiver empty. Fig. 3 is a sectional view transversely through the machine or transverse to the direction or length of the beam. Fig. 4 is a transverse sectional view through the center of the receiver and the fulcrum members associated therewith. Fig. 5 is a plan view of one half of the scale beam showing a part of the receiver and weight and the fulcrum members. Fig. 5ᵃ is a plan view of a fulcrum bearing having ribs forming complete circles. Fig. 6 is a view similar to Fig. 1 of a common scale in which instead of using a series of concentric ribs on the stationary member coacting with a series of grooves on the beam fulcrum member, I employ a single rib and a single groove. Fig. 7 is a plan of the main fulcrum on the frame similar to that shown in Fig. 6. Fig. 8 is a transverse sectional view of the fulcrum of Fig. 7. Fig. 9 is a view similar to Fig. 1, of another form of beam scale with my improvements embodied therein. Fig. 10 is a plan view of the fulcrum members shown in Fig. 11, the scale beam being shown in section. Figs. 11 and 12 are detail views of a fulcrum in which both members are curved. Figs. 13, 14, 15 and 16 are views of a modified form of the fulcrum members.

Referring to Figs. 1 to , 1 indicates a standard forming a part of the stationary frame, there being one of these standards as shown in Fig. 3 at each side of the scale, and 2 indicates generally the scale beam. This consists of two side arms 2′, Fig. 3, and one of which is shown in Fig. 5, fixed to a bar 3 extending transversely between the arms. This bar 3 extends beyond the arms and has fixed at its ends by screws 4 the fulcrum members 5 which bear upon the fulcrum members 6 at the upper ends of the standards 1. The arms of the scale beam are secured to the bar 3 by the screws 7. The scale beam carries at one end a receiver 8, and at its other end a weight 9. The weight is supported from rods 10 screw threaded at their lower ends, and passing through ears 11 on the weight, being held thereto by the nuts 12 so that the weight may be adjusted in relation to the scale beam. The upper ends of the rods 10 are connected with a cross bar 13, which carries a fulcrum member 14 coacting with a fulcrum member 15 on the scale beam. There is a similar fulcrum 15′ at the other end of the scale beam which coöperates with the fulcrum 14′ on the receiver, this receiver depending, as shown in Figs. 1, 2, 4 and 5, between the arms of the scale beam. It will be observed that each pair of fulcrum members comprises a substantially flat or straight member, as for instance the member 6 on the frame, and a member as 5 coöperating therewith having a curved surface formed on the arc of a circle, of which the center of the rod 3 is the central point. The main fulcrum has the flat or straight fulcrum on the frame and the curved member on the beam, but I do not confine myself to this construction, and I show at the fulcrum members between the beam and the receiver and the weight respectively that the lower fulcrum member may be curved and the upper fulcrum member may be straight or flat. In either case there is a rolling engagement between the fulcrum members instead of as in ordinary practice, having a knife edge bearing on one member engaging the other fulcrum member.

In order to maintain the fulcrum members in proper relation in whatever angular position they may be, I provide a special construction consisting in forming one fulcrum member with a series of concentric ribs and the other fulcrum member of a series of grooves to receive the ribs and maintain the proper control of the scale beam in whatever position it may be in relation to the frame. Where, as in the form which I have chosen to illustrate the principle of my invention, one fulcrum member is flat or straight and the other fulcrum member curved, the concentric ribs will be formed on the straight member and the grooves on the curved member will be of elliptical shape. They will be concentric though not circular. The grooves in cross section are formed on arcs of larger radius than the radius upon which the ribs are struck. It will be seen that in all positions of the beam the ribs and grooves will maintain the proper control and prevent displacement of the beam either longitudinally, laterally, or in any other direction in relation to the stationary fulcrum member, as no matter what the position of the beam may be the grooves and ribs will at some point engage each other and thus maintain the proper control. The extreme angle of inclination which I have shown as the most suitable is that shown in Fig. 2, being an angle of 30°, and the distance from the main center to each outside fulcrum is such that the rolling line at the outside fulcrum is just in line with the center from which the circle or curve of the upper fulcrum member is struck. When the beam is in this extreme angular position the machine, provided there is no material in the receiver, is poised because of the elongation of the lever arm on the side of the receiver and the corresponding shortening of the lever arm on the side of the weight, the mass of the material being transported toward the side of the receiver. In this position of the parts, the receiver being empty, the scale beam is at rest.

Instead of having a plurality of concentric rings and a plurality of grooves to engage the same, I may employ as in Fig. 6 a single circular groove 6′ on the frame to engage a single elliptical rib 5′ on the curved fulcrum member of the beam, and I may also employ a projecting straight guide, that is straight in the longitudinal direction of the beam, as at 16, to engage a groove on the opposing fulcrum member and thus prevent the beam from turning laterally or in a horizontal plane around the main center. In other words, by this straight rib and groove the beam will be held so as to maintain its longitudinal position in relation to the frame.

Fig. 5ᵃ illustrates that the fulcrum members may have continuous ribs, the ribs shown being complete circles.

Referring to Figs. 9 and 12, instead of using complete circular ribs and complete ellipses on the fulcrum members, I may employ a series of half rings or any part of a full circle as shown in Fig. 10 at 17, or a single half ring or other part of a circle may be employed, if desired, this ring or rings coöperating with a half ellipse or half ellipses or other part of a full ellipse on the other fulcrum member, and this formation of fulcrum may be employed either at the main fulcrum or for the fulcrums between the scale beam and the receiver and weight.

When the scale is to be used for heavy weighing, the complete rings and ellipses are preferred. If light work is to be done, the other half rings and ellipses or other parts of the full circle and ellipse will answer the purpose. Neither do I limit myself to the use of the fulcrum members one of which is straight and the other curved. I may employ fulcrum members both of which are curved, as shown in Figs. 11 and 12.

My invention is applicable in any form of weighing machine or scale having a beam with fulcrum members between the same and the frame, whether the machine be automatic in its action or of the common scale variety.

It will be observed from Fig. 10 that the bearing may be made up of two sets of curved interengaging members and in the instance illustrated these are of semi-circular form on the lower member, and the upper member will be formed elliptical or of other proper shape to correspond. It will be observed from the above that the fulcrum members themselves exert control over the beam in all positions thereof, preventing it from being displaced in any direction. As also stated, the curved interengaging ribs and grooves maintain control of the beam in all positions thereof and they operate at all times on definite lines, the high parts of the ribs seeking a bearing along the line of the low part of the groove.

The beam is poised when in the position shown in Fig. 2, this being due to the length of the arm on the receiver side of the beam and also to the shape of the beam which presents the preponderance of material at the proper point to secure the poise of the beam when in the position shown in Fig. 2 at an angle of 30°. With the receiver empty at the angular position indicated, the beam will begin to move as soon as the first particle of the material enters the receiver.

The scale shown in Fig. 6 is of the common scale beam form having a single arm or lever and the straight rib is therefore necessary in order to prevent this arm or beam from turning in a horizontal plane or laterally. I may employ a series of these straight ribs.

In Figs 13, 14 and 15 I show another form of fulcrum in which one of the members, namely, the member 19 on the beam, is provided with a plain curved bearing face 20 rolling on a series of ribs 21 on the fulcrum member 22 of the frame. These ribs extend parallel with each other and parallel with the direction of movement of the beam, and they afford bearing edges or lines upon which the plain face of the beam fulcrum rolls. This form of fulcrum as in the forms above described is controlled against displacement in any direction by curved interchanging members consisting of the ribs 23 on the frame member and curved in a horizontal plane and engaging grooves 24 in the beam fulcrum member, which grooves like those above described are of elliptical shape, though it is not necessary that they form complete ellipses. As shown in Fig. 13, the fulcrum member may be cut off along the line 25, as the extent of the interengaging members there shown in full lines is sufficient to maintain the engagement between the parts in the extreme inclination which the beam is capable of assuming. The line 26—26 represents the limit of movement corresponding to a chosen angle of 30°, it being understood that this angle may be varied. It will be observed that in this form the weight of the beam with all its parts connected therewith and supported thereby is taken by the longitudinal extending ribs 21, and also by the interengaging curved members 23, 24, and in all of the forms of fulcrum above described as well as the form now being described, the curved fulcrum member presents a bearing face corresponding to the segment of a cylinder.

Where with the form of fulcrum shown in Figs. 13, 15, only a single arm or beam is employed, I use the straight interengaging members, these being illustrated in Fig. 16, where a rib 27 on the frame member engages a groove on the beam member, said rib extending in the direction of movement, or in the longitudinal plane of the beam. This rib may be arranged at the central line of the beam and have upon each side thereof the ribs 21 above mentioned.

I may place either the ribs or the grooves on the curved member and form the other member to correspond.

I claim as my invention:

1. In a weighing machine, the combination of a supporting frame and a beam with non-concentric fulcrum members between the same, one of which is curved to roll upon the other, one of said members having a curved rib and the other of said members having a curved groove to engage the curved rib and control the relation of the beam both laterally and longitudinally in all angular positions of the beam, the curve of said groove and rib being each in a horizontal plane when the beam is horizontal and in a direction transversely of the fulcrum members, substantially as described.

2. In combination in a weighing machine or scale, the main frame, the scale beam, and non-concentric fulcrum members between, one of which is curved to roll on the other, one member having a rib struck on the arc of a circle and the other member having an elliptical groove, the curve of said groove and rib being each in a horizontal plane when the beam is horizontal and in a direction transversely of the fulcrum members, substantially as described.

3. In combination with the main frame fulcrum, the beam fulcrum, said fulcrums being non-concentric and having interengaging portions curved in a direction transversely of the fulcrum members and one fulcrum member having rolling contact with the other and a projecting straight guide to prevent the scale beam from turning horizontally in relation to the frame, one of said curved interengaging portions lying in a horizontal plane, substantially as described.

4. In combination, in a scale beam, the non-concentric fulcrum members having interengaging parts and one being curved to roll on the other, one of said members having its said parts of elliptical form curving laterally of the member, the corresponding parts of the other member lying in a horizontal plane, substantially as described.

5. In combination in a weighing apparatus, the fulcrum members one of which has a plain curved bearing surface and the other a series of ribs extending parallel with each other and with the direction of movement of the beam, said plain curved bearing surface being supported by the lines provided by the series of ribs and controlling means consisting of the interengaging members on the fulcrum members, said members being curved transversely of the fulcrum members and one set of said members lying in a horizontal plane, substantially as described.

6. In combination in a weighing apparatus, the fulcrum members one of which has a plain curved bearing surface and the other a series of ribs extending parallel with each other and with the direction of movement of the beam, said plain curved bearing surface being supported by the lines provided by the series of ribs and controlling means consisting of the interengaging parts on the fulcrum members, said parts being curved transversely of the fulcrum members and one member having a straight rib and the other member having a straight groove engaged by said rib, substantially as described.

In testimony whereof, I affix my signature in presence of two witnesses.

WILLIAM F. BRAUN.

Witnesses:
WALTER DONALDSON,
CHARLES E. PARSONS.